(12) United States Patent
Soerensen et al.

(10) Patent No.: US 12,418,227 B2
(45) Date of Patent: Sep. 16, 2025

(54) ASSEMBLY OF A MULTI-SEGMENT STATOR

(71) Applicant: Siemens Gamesa Renewable Energy A/S, Brande (DK)

(72) Inventors: Martin Bach Soerensen, Herning (DK); Marius Fürst-Sylvester, Cuxhaven (DE); Benjamin Henriksen, Herning (DK); Thorsten Schneider, Cuxhaven (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 405 days.

(21) Appl. No.: 17/766,748

(22) PCT Filed: Sep. 22, 2020

(86) PCT No.: PCT/EP2020/076435
§ 371 (c)(1),
(2) Date: Apr. 6, 2022

(87) PCT Pub. No.: WO2021/073841
PCT Pub. Date: Apr. 22, 2021

(65) Prior Publication Data
US 2024/0088762 A1    Mar. 14, 2024

(30) Foreign Application Priority Data
Oct. 16, 2019   (EP) .................................... 19203583

(51) Int. Cl.
*H02K 15/50*     (2025.01)
*G01B 11/02*     (2006.01)
*G01B 11/26*     (2006.01)

(52) U.S. Cl.
CPC ........... *H02K 15/50* (2025.01); *G01B 11/026* (2013.01); *G01B 11/26* (2013.01)

(58) Field of Classification Search
CPC ..... G01B 11/026; G01B 11/26; G01B 11/002; H02K 1/148; H02K 15/02; H02K 2201/15;
(Continued)

(56) References Cited

U.S. PATENT DOCUMENTS 4,456,581 A * 6/1984 Edelmann ............... B01F 25/45
    422/547
6,487,769 B2 * 12/2002 Ketterer ................ B23P 11/025
    29/596
(Continued)

FOREIGN PATENT DOCUMENTS

CN        108 519 055 A      9/2018
DE    10 2012 206867 A1    10/2013
(Continued)

OTHER PUBLICATIONS

International Search Report & Written Opinion for PCT/EP2020/076435 issued Dec. 15, 2020.
(Continued)

*Primary Examiner* — Donghai D Nguyen
(74) *Attorney, Agent, or Firm* — Schmeiser, Olsen & Watts, LLP (57) ABSTRACT

A method of determining a readjustment value in position and/or in orientation of a stator segment of a multi segment stator of an electrical machine is provided, the stator segment to be assembled with a shaft, the method including: detecting positions of plural first reference objects attached to the stator segment using a camera system; detecting positions of plural second reference objects attached to the shaft using a laser tracking system; detecting positions of plural third reference objects attached to the camera system using the laser tracking system; determining the readjustment value in position and/or in orientation of the stator
(Continued)

segment based on the positions of the plural first, second and third reference objects.

16 Claims, 3 Drawing Sheets

(58) Field of Classification Search
CPC ........... Y10T 29/49009; Y10T 29/5313; Y10T 29/53143; G01C 11/02
See application file for complete search history.

(56) References Cited

U.S. PATENT DOCUMENTS

| | | | |
|---|---|---|---|
| 7,587,258 B2 * | 9/2009 | Marsh | G01C 11/02 |
| | | | 356/3 |
| 8,978,581 B2 * | 3/2015 | Yano | B25J 9/1679 |
| | | | 118/667 |
| 2007/0265728 A1 | 11/2007 | Marsh et al. | |

FOREIGN PATENT DOCUMENTS

| | | |
|---|---|---|
| DE | 20 2017 102247 U1 | 7/2018 |
| JP | 2019 154159 A | 9/2019 |

OTHER PUBLICATIONS

Schmitt R H et al: "Advances in Large-Scale Metrology—Review and future trends", Cirp Annals, Elsevier BV, NL, CH, FR, vol. 65, No. 2, Jun. 20, 2016 (Jun. 20, 2016), pp. 643-665.

* cited by examiner

ASSEMBLY OF A MULTI-SEGMENT STATOR

CROSS-REFERENCE TO RELATED APPLICATIONS

This application claims priority to PCT Application No. PCT/EP2020/076435, having a filing date of Sep. 22, 2020, which claims priority to EP Application No. 19203583.0, having a filing date of Oct. 16, 2019, the entire contents both of which are hereby incorporated by reference.

FIELD OF TECHNOLOGY

The following relates to a method and to an arrangement of determining a readjustment value in position and/or orientation of a stator segment of a multi-segment stator of an electrical machine. Further, the following relates to a method of assembling a stator segment of such a multi-segment stator with a shaft and further relates to a method of assembling a multi-segment stator of an electrical machine.

BACKGROUND

Building an electrical machine, such as a generator or a motor, requires assembling a stator and further to assemble a rotor and put the stator and rotor together. Since nowadays the electrical machines become larger and larger, the stator is conventionally assembled from multiple stator segments. The multiple stator segments need to be properly assembled. Assembling the multiple stator segment requires to properly adjust or align or arrange those stator segments regarding position and/or orientation.

Conventionally, a photogrammetry system has been used to measure position of the stator segment. Furthermore, values of the rotor house of the rotor are typed conventionally into an Excel sheet where the operator finds out how much each corner of each stator segment needs to be moved. After adjustment of all segments of the stator, conventionally, the entire stator is measured again with photogrammetry to verify that the adjustment has worked as intended. Thus, the conventional system works in an iterative manner and the result of the readjustment can only be verified when the next complete measurement has been performed.

It has been observed that, when the generator becomes larger, the conventional measurement systems often deliver results within insufficient accuracy compared to assembly tolerances. When the stator segments are not, regarding position and/or orientation, properly arranged or assembled, collisions with a rotor or at least deviations with desired air gap size to the rotor having mounted thereon plural magnets may occur. Furthermore, it has been observed that the assembly process is very time-consuming, since the conventional measurement only provides position results after each iteration of the production process, where adjustor blocks are changed based on a first measurement. Thus, the operator does not know the result of the adjustment process, until the next measurement has been performed. This conventionally leads to many iterations of the adjustment and measurement which is very time-consuming.

Thus, there may be a need for a method and an arrangement of determining a readjustment value of position and/or orientation of a stator segment of a multi-segment stator of an electrical machine, the stator segment to be assembled with a shaft, wherein the accuracy of a proper assembly regarding position and/or orientation is improved, while required time is reduced compared to conventional methods and systems.

SUMMARY

An aspect relates to a method of determining a readjustment value in position and/or in orientation of a stator segment of a multi segment stator of an electrical machine, the stator segment to be assembled with a shaft, the method comprising: detecting positions of plural first reference objects attached to the stator segment using a camera system; detecting positions of plural second reference objects attached to the shaft using a laser tracking system; detecting positions of plural third reference objects attached to the camera system using the laser tracking system; determining the readjustment value in position and/or in orientation of the stator segment based on the positions of the plural first, second and third reference objects.

The method may be performed by an arrangement for determining a readjustment value according to an embodiment of the present invention. The method may partly be implemented in software and/or hardware. The readjustment value may relate to a value regarding position and/or a value regarding orientation of the stator segment. The readjustment value may for example be given in a length unit and/or angle unit, such as degrees. The multi segment stator may have a cylindrical shape. The electrical machine may be an electrical generator or an electrical motor. In particular, the electrical machine may be an electrical generator of a wind turbine.

The stator segment may comprise ferromagnetic material, soft ferromagnetic material, having a high permeability. The completed stator may further comprise one or multiple (for example three-phase) winding sets which are wound around teeth or through slots comprised in each of the stator segments. The shaft may also have a cylindrical shape and may comprise a center axis, in particular symmetry axis. Each stator segment is to be assembled with a shaft and then, after successful positioning, must be mounted thereon.

The first reference objects and the second reference objects and the third reference objects may be objects which are easily visible by imaging those using one or more cameras of the camera system. The reference objects may be active reference objects such as light sources or may be inactive reference objects, such as particular reflectors, such as cat eye reflectors. The reference objects may have a relatively small (lateral) extension or size, such as for example between 0.5 mm and 10 mm and may have even smaller thickness such as between 0.01 mm and 1 mm. All reference objects may be attached to the respective stator segment or shaft or camera system at predetermined positions. By detecting the position of the reference objects, the position and orientation of the entire object to which they are respectively attached, i.e., the stator segment, the shaft and the camera system, may be derivable and derived by the method.

For example, the first reference objects may all be attached to a radial outer surface of the respective stator segment, including also a first reference object at each corner (or edge) of the stator segment. The second reference objects may be attached at a radial outer surface of the shaft, including at least some second reference objects which are arranged in a same plane perpendicular to the axis of the shaft. The third reference objects may be attached to (a frame or casing of or one or more cameras of) the camera system also at predetermined positions.

The laser tracking system may comprise a laser source for generating a laser beam, a goniometer for directing the laser beam in a particular direction and for measuring direction angles, two angles (for example of a spherical coordinate system). The laser tracking system may further comprise a distance measurement capability using the laser beam and an interferometer e.g., Thereby, the laser tracking system is enabled to determine a three-dimensional position of each of the third reference objects and each of the second reference objects. The camera system does not need to acquire image data from the shaft. Position and/or orientation of the shaft may only be detected using the laser tracking system. Since the laser tracking system also detects the positions of the plural third reference objects attached to the camera system, a positional and orientational relationship between the position and orientation of the camera system and the position and orientation of the shaft can be established. As a consequence, also a relative arrangement of the stator segment relative to the shaft can be established or derived by the method. Thereby, it may be determined whether the stator segment is positioned and oriented in a desired or target position and orientation, relative to the shaft. Thereby, the readjustment value, i.e., a value according to which the stator segment is to be rearranged (to result in the target position and/or orientation), may easily be determined. Furthermore, the accuracy may be improved, since the laser tracking system is enabled with high accuracy to determine position of an object relatively far away, while the camera system may provide positional data with lower and lower accuracy for farer and farer apart objects. Thus, using the camera system, the position of the shaft would not have been determined in such high accuracy compared to using the laser tracking system.

According to an embodiment of the present invention, the method further comprises determining position and orientation of an axis of the shaft based on the positions of the plural second reference objects, wherein determining the readjustment value is further based on the determined position and orientation of the axis of the shaft.

The axis of the shaft may be a cylinder symmetry axis of the shaft. In the completely assembled electrical machine, such as a generator, the axis of the shaft may further coincide with the axis of a rotor of the electrical machine, in particular outer rotor, having for example permanent magnets attached.

The second reference objects may be arranged for example in equal distances in a circumferential direction around an outer surface of the shaft, in one or several planes perpendicular to the axis of the shaft. For example, the arithmetic mean of the (e.g., 3D) positions of all the second reference objects may define the location of the axis of the shaft in this plane. The axis may then be inferred to be perpendicular to this plane. Alternatively, or additionally measuring second reference objects in several (axially spaced apart) planes may enable to also derive the direction of the axis. The outer surface (or any other point) of the stator segment may for example be intended to be arranged at a particular distance from the axis of the shaft. Thus, knowing the position and/or orientation of the axis may easily allow to determine the readjustment value.

According to an embodiment of the present invention, the camera system comprises at least two or three or four cameras or more cameras each acquiring 2D image data from the stator segment from different viewing areas, wherein detecting the positions of the plural first reference objects comprises 3D reconstruction of a volume portion comprising the first reference objects based on the 2D image data of each of the at least two cameras.

The one or more cameras may be visible light sensitive cameras each including e.g., a two-dimensional array of light sensitive elements. The cameras may be sensitive to different spectral ranges of the electromagnetic radiation, such as infrared, visible, ultraviolet and a combination therefrom. The two or more cameras may be arranged at different positions and may be arranged in different or same orientations. Thus, the stator segment may be viewed by the different cameras from different viewing directions and/or positions. The first reference objects may for example be imaged as relatively bright features in the images. The images or the reconstructed 3D volume may be searched for the first reference objects by any peak detection method e.g. The 3D reconstruction may for example comprise a back projection using the two-dimensional images of the different cameras or may also involve Fourier techniques. Since the position of the camera system (each of the cameras comprised in the camera system) is known from the detection of the positions of the third reference objects using the laser tracking system, which also determines the positions of the second reference objects on the shaft, the positional relationship between the shaft and the stator segment can be established.

According to an embodiment of the present invention, the plural first reference objects include at least 9, in particular between 9 and 100, or more first reference objects, which are in particular attached to a radial outer surface of the stator segment, and/or wherein the plural second reference objects include at least 3, in particular between 3 and 6, or more, second reference objects, from which at least 3 are arranged in a same plane perpendicular to the axis of the shaft, and/or wherein the plural third reference objects include, in particular for each camera of the camera system, at least 4, or more, third reference objects, wherein the first and/or second and/or third reference objects in particular include light reflectors attached using adhesive.

The first reference objects may for example include in each (of one or plural) plane perpendicular to a cylinder axis of the respective stator element three first reference objects or more than three objects, such as four, five, six or even more. As an example, the first reference objects may be arranged in three axially spaced apart planes each plane having three first reference objects. All first reference objects may be visible and imaged by all cameras of the camera system. The second reference objects may be arranged around an outer circumference of the shaft, for example at same angular distances from each other. Detection of three such second reference objects already would be sufficient to determine the position and the orientation of the axis of the shaft, if a cylindrical symmetry of the shaft and the placement of the second reference objects is assumed.

The camera system may comprise one or more cameras in fixed relative position and orientation. In this case, it may be sufficient to apply for example four third reference objects for example arranged at four corners of the camera system. The viewing angle of all the cameras comprised in the camera system may then be derived from the predetermined relative position of all the cameras within the camera system (and pre-known orientation of the cameras within the camera system) and the positions of the at least four third reference objects.

Using light reflectors attached using adhesive as reference objects may simplify the method.

According to an embodiment of the present invention, the laser tracking system is configured to detect the positions of the plural second and the third reference objects by detecting two angle values and a distance value of each of the second and the third reference objects.

The laser tracking system may comprise a goniometer for measuring a direction of a laser beam emitted by the laser tracking system. The goniometer thereby allows the determination of the two angles, such as spherical angles. Having further the distance value (towards the detected reference object) determined by the laser tracking system thus allows the determination of the three-dimensional coordinate of the respective detected reference objects.

According to an embodiment of the present invention, the camera system and/or the laser tracking system is configured to acquire measurement data at a rate of between 1 Hz and 10 Hz or more. When the camera system and/or the laser tracking system has a relatively high acquisition rate, the assembly process may be accelerated. In particular, the assembly process may resemble a live process where immediately after a slight rearrangement the measurement result is available.

According to an embodiment of the present invention, determining the readjustment value in position and/or in orientation of the stator segment is further based: on a target geometry of the stator, and/or on a target position and orientation of the stator segment relative to the shaft.

The target geometry may relate to a geometry of an outer surface of the completed stator. The target position and orientation of the stator segment may for example comprise the definition of the distance between the axis of the shaft and the outer surface of the respective stator segment.

According to an embodiment of the present invention, the target geometry of the stator segment and/or on a target position and orientation of the stator segment relative to the shaft is derived from geometry data of a rotor, in particular outer rotor, of the electrical machine, the rotor to be assembled with the completed stator.

The rotor ideally may have at for example a radially inner surface a (at least substantially) cylindrical shape. Due to manufacturing tolerances or errors however, the radially inner surface of the rotor may not exactly correspond to a cylinder. The rotor may have different radii at different circumferential (and/or axial) positions. To avoid collisions between portions of the rotors with the completed stator, the target geometry of the stator may be defined such as to have a maximal diameter which is smaller (for example by the drive air gap) than the minimal radially inner diameter of the rotor. Thereby, the stator may be assembled in a shape which is individually defined for a particular rotor. Thereby, the method may be applied to differently shaped rotors.

According to an embodiment of the present invention, the geometry data of the rotor comprise at least data indicative of or defining a minimal diameter of the rotor.

The 3D coordinates of the respective reference objects may easily be determined using for example reconstructed two-dimensional image data or using the laser tracking data. Internally, the method may work not only with the respective 3D coordinates of all the reference objects but may also include geometry or shape data of the respective stator segment, and/or the shaft and/or the rotor.

According to an embodiment of the present invention, the stator segment is shaped as a cylinder segment, spanning between 20° and 180°; and/or wherein the shaft has a cylindrical shape. The stator may for example be assembled by two, three, four, five, six or even more separate stator segments. Thereby, also relatively large electrical machines and respective stators may be assembled and built by applying the method. In other embodiments, the shaft may be different from a cylindrical shape, for example having a quadratic, rectangular or oval shape in cross-section.

According to an embodiment of the present invention it is provided a method of assembling a stator segment of a multi segment stator of an electrical machine with a shaft, the method comprising: performing a method of determining a readjustment value in position and/or in orientation of a stator segment of the multi segment stator according to one of the preceding embodiments; changing position and/or orientation of the stator segment according to the readjustment value; and mounting the stator segment to the shaft, if the readjustment value in position and/or in orientation is below a threshold.

The changing the position and the orientation may be performed manually e.g., by applying inserting appropriate spacer elements or distance changing elements. In other embodiments, the changing the position and the orientation may be performed using a hydraulic and/or electrical motor manipulator system holding the stator segment and being enabled to move the stator segment by predefined or desired length extensions and turn the stator segment around desired axes having a desired angle.

The method of determining the readjustment value and the changing the position and/or orientation of the stator segment may be performed in an iterative manner until the readjustment value is below a threshold or until the reached position and/or orientation of the stator segment equals to a target position and/or orientation or deviates from this target position and/or orientation only by tolerable amount.

According to an embodiment of the present invention it is provided a method of assembling a multi segment stator of an electrical machine, the method comprising: performing a method of assembling a stator segment of the multi segment stator with a shaft according to the preceding embodiment for all stator segments, wherein in particular the laser tracking system and/or the camera system is fixed; and assembling the multi segment stator with a rotor, in particular an outer rotor, in particular including plural mounted permanent magnets.

After a first stator segment has been assembled with the shaft, the system of already assembled stator segments with the shaft may be rotated to bring the next stator segment to be assembled into the viewing range of the tracking system and the camera system.

In other embodiments of the present invention, the emerging stator including the already assembled stator segments with the shaft may be held fixed and the camera system as well as the laser tracking system may be rotated or moved to a next position where a next stator segment is to be assembled.

It should be understood that features, individually or in any combination, disclosed, described, explained or provided for a method of determining a readjustment value in position and/or in orientation of a stator segment of a multi segment stator of an electrical machine are also, individually or in any combination, applicable to an arrangement for determining a readjustment value according to embodiments of the present invention and vice versa.

According to an embodiment of the present invention it is provided an arrangement for determining a readjustment value in position and/or in orientation of a stator segment of a multi segment stator of an electrical machine, the stator segment to be assembled with a shaft, the arrangement comprising: a camera system configured to detect positions of plural first reference objects attached to the stator segment; a laser tracking system configured: to detect positions of plural second reference objects attached to the shaft; to detect positions of plural third reference objects attached to the camera system; and a processor configured to determine the readjustment value in position and/or in orientation of the stator segment based on the positions of the plural first, second and third reference objects.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

Figure 1:
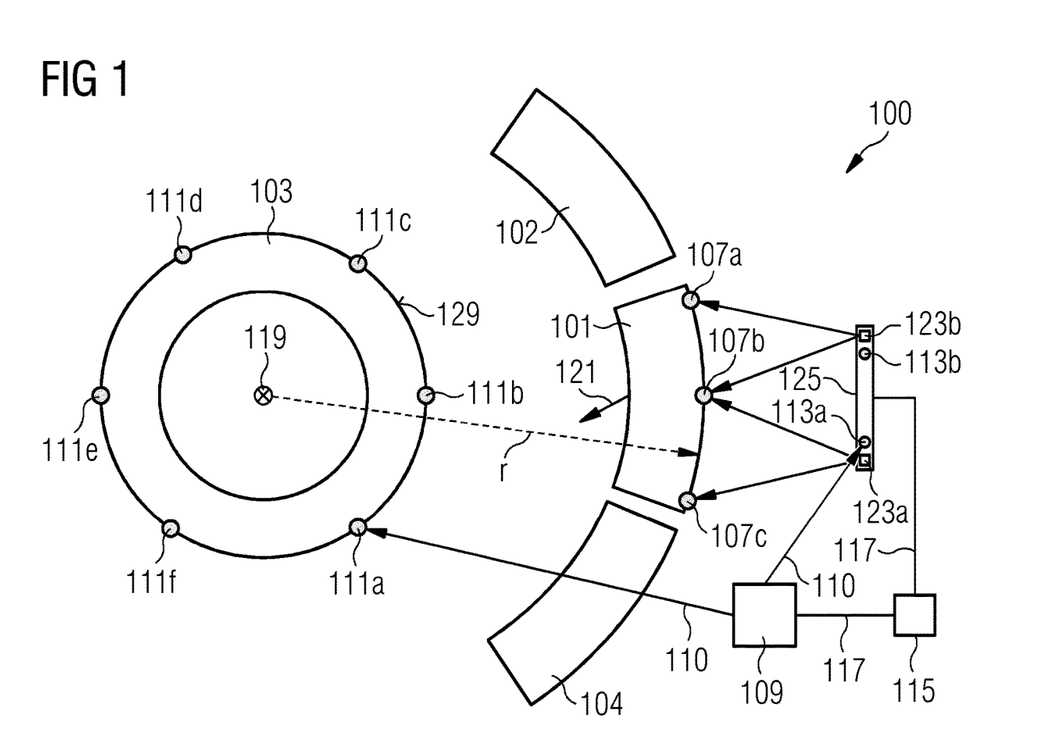
FIG. 1 schematically illustrates an arrangement for determining a readjustment value in position and/or in orientation of a stator segment of a multi segment stator of an electrical machine according to an embodiment of the present invention performing a method according to an embodiment of the present invention in an elevational view.

The arrangement 100 for determining a readjustment value in position and/or in orientation of a stator segment 101 of an electrical machine (not illustrated completely), wherein the stator segment 101 is to be assembled with a shaft 103, comprises a camera system 105 which is configured to detect positions of plural first reference objects 107a, 107b, 107c attached to the stator segment 101. The arrangement 100 further comprises a laser tracking system 109 which is configured to detect positions of plural second reference objects 111a, . . . , 111f attached to the shaft 103. The laser tracking system 109 is further configured to detect positions of plural third reference objects 113a, 113b attached to the camera system 105. Thereby a laser beam 110 is generated and emitted in a particular direction involving distance and angle measurement.

The arrangement 100 further comprises a processor 115 which receives via control and signal lines 117 data from the camera system 105 as well as from the laser tracking system 109 and is configured to determine the readjustment value in position and/or in orientation of the stator segment 101 based on the positions of the plural first (107a, 107b, 107c), second (111a, . . . , 111f) and the third (113a, 113b) reference objects.

In FIG. 1, the arrangement 100 including the stator segment 101 to be presently assembled as well as other stator segments 102, 104, later to be assembled and including the shaft 103 is depicted in an elevational view along an axis 119 of the shaft 103 which will coincide with a rotor axis of a completed generator. The arrangement 100 is configured to perform a method of determining a readjustment value in position and/or orientation of the stator segment 101 of a multi segment stator of an electrical machine.

After the tracking system 109 has determined the position of the second reference objects 111a, 111b, 111f, the position of the axis 109 of the shaft is determined based on the position of the plural second reference objects 111a, . . . , 111f. The readjustment value exemplary depicted as a translation arrow 121 is then determined based on the position and orientation of the axis 119 of the shaft 103. After having performed the measurement, the stator segment 101 may actually be shifted or moved in accordance with the readjustment value 121 (which may also include a definition of an intended rotation or turning).

In the embodiment illustrated in FIG. 1, the camera system 105 includes two cameras 123a, 123b on one horizontal plane and (not illustrated) two other cameras in another horizontal plane arranged in a fixed relative position in a frame 125 or supported by a frame 125 (e.g., manufactured from warp resistant carbon). The in total four cameras including the two cameras 123a, 123b have slightly different viewing angles and image each or the first reference objects 107a, 107b, 107c. A 3D construction may then reconstruct a volume portion comprising the first reference objects 107a, 107b, 107c based on 2D image data acquired by the two (or more) different cameras 123a, 123b. In other embodiments, more than two cameras may be provided to increase the accuracy or position determination even more.

As can be appreciated from FIG. 1, the first reference objects 107a, 107b, 107c are arranged at a radial outer surface 127 of the stator segment 101 and are also arranged in the drawing plane which coincides with a plane perpendicular to the axis 119 of the shaft. The second reference object 111a, . . . , 111f are arranged at an outer radial surface 129 of the shaft 103 and are also arranged in a same plane perpendicular to the axis 109 of the shaft 103.

According to an embodiment of the present invention, the stator segment 101 will be assembled with the shaft 103 such that the radius r, i.e., the distance between the axis 119 of the shaft 103 and the outer surface 127 of the stator segment is smaller than a minimal radius of a rotor to be assembled with the completed stator.

As can be taken from FIG. 1, the stator segment spans an angle region of around 30°. In other embodiments, the stator segment may span another angle range. As can be taken from FIG. 1, the shaft 103 has a cylindrical shape and extends in the shape as depicted in FIG. 1 also along the axial direction (direction of the axis 119). After having adjusted the proper position of the stator segment 101, the assembly consisting of the shaft and the mounted stator segment may be rotated (clockwise or anti-clockwise) and the next stator segment (i.e., the stator segment 102 or 104) may be properly aligned or readjusted before mounting also this stator segment to the shaft 103. The stator segments may be mounted using bolts or frames or bars or the like.

Figure 2:
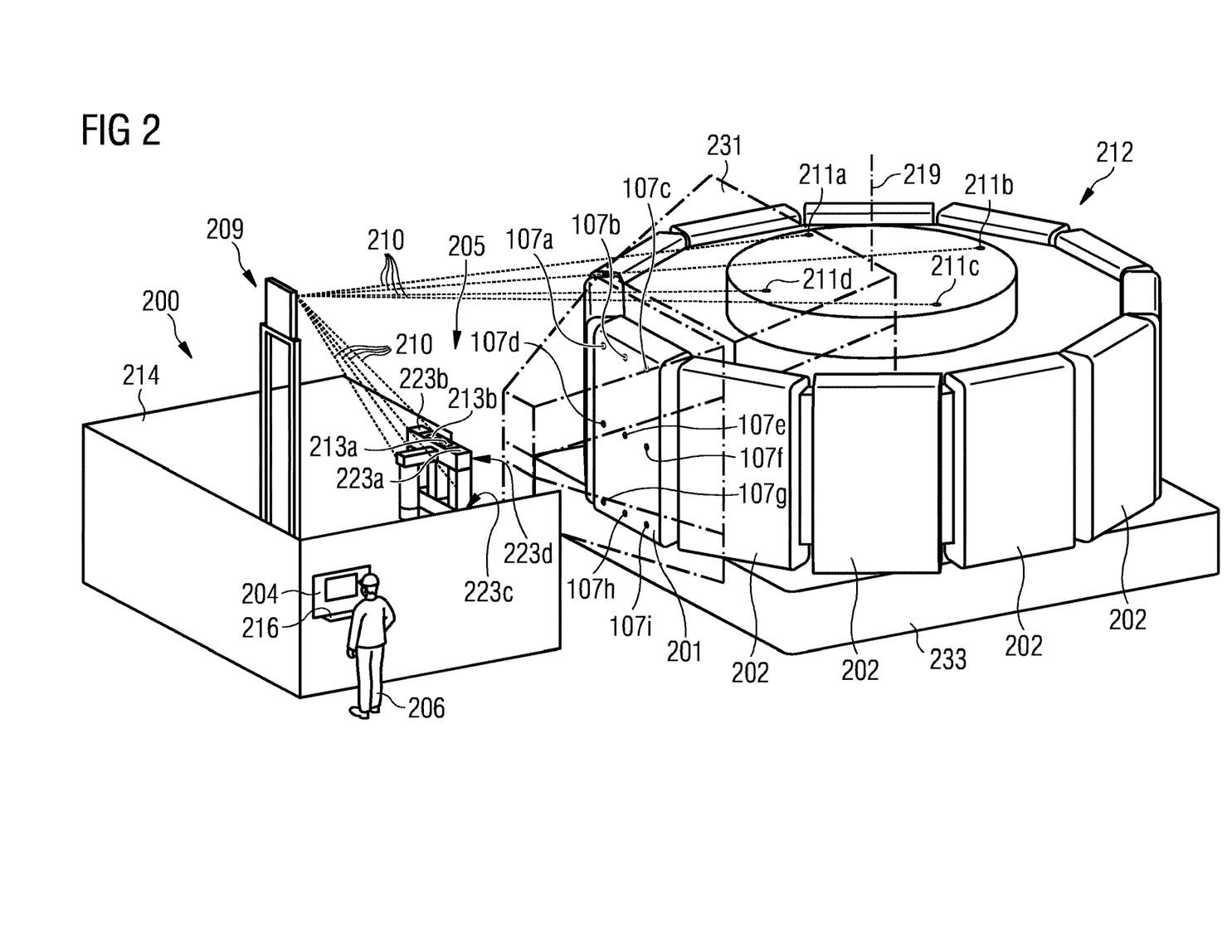
FIG. 2 schematically illustrates an arrangement for determining a readjustment value in position and/or in orientation of a stator segment of a multi segment stator of an electrical machine according to another embodiment of the present invention performing a method according to an embodiment of the present invention in a perspective view.

FIG. 2 schematically illustrates an arrangement 200 for determining a readjustment value according to another embodiment of the present invention in a perspective view. Elements similar in structure and/or function in different FIGS. 1 and 2 are labelled with the same reference signs differing only in the first digit. A description of one element not in detail described with reference to a particular embodiment may be taken from the description of this element in another embodiment or figure.

The shaft 203 has attached four second reference objects 211a, 211b, 211c, 211d instead of six as are shown in FIG. 1. The laser tracking system 209 detects the positions of all these four second reference objects 211a, . . . , 211d. Furthermore, the tracking system 209 also detects the position of third reference objects 213a, 213b, 213c, 213d of a camera system 205. Each camera 223a, 223b, 223c, 223d of the camera system 205 covers at least a viewing range 231 including six first reference objects 107a, . . . , 107i at the stator segment 201. These reference objects 107a, . . . , 107i are grouped in three groups of reference objects each group including first reference objects arranged in one plane perpendicular to the axis 219 of the shaft 203.

The arrangement 200 is enclosed in a fence 214 also including the processor and a viewing screen 204 which can be watched by an operator 206. Further, an input module 216 is provided for allowing the operator 206 to start or stop the measurement process.

The arrangement may include a roboter used to calibrate the four cameras. For this purpose, a ruler is placed into the measurement volume or viewing area and is imaged by all cameras.

Further, an artefact having reference objects placed as on the stator segment may be imaged to know the positions of the photogrammetry. Using the artefact images the data from the laser tracker and the data from the camera system may be mapped (linked) to each other.

The arrangement 200 further comprises a rotation stage 233 onto which the stator segments 201, 202 and the shaft 203 are placed. The rotation stage 233 is rotatable to allow to bring successively the different stator segments to be assembled with the shaft 203 into the viewing range 231 of the camera system 205. When all stator segment 201, 202 are mounted to the shaft 203 a stator 212 is formed.

According to an embodiment of the present invention, the measurement system 100 or 200 may return live feedback to an automatic adjustment/manipulator system. An overall control (for example hardware and/or software) may handle all data coming from the measurement and manipulator systems. The measurement system may consist of two different measurement tools, namely a laser tracking system for basic alignment between the fixed shaft and two scanners (e.g., cameras), that can detect the surface of the stator segment. The system (for example arrangement for determining the readjustment value) may be able to take into account variations to values from many different parameters (for example rotor house data, stator plate data, magnetic pull, airbag target or final generator) so that the most optimal position of the segment may be achieved.

The output values of the measurement system (for example stator size, position of each corner of each segment) may be stored (e.g. in electronic storage accessible to processor 115, see FIG. 1) with data from the incoming part (for example rotor house, fixed shaft and stator plate) and other important process data (for example data, time, production order ID, temperature of segments, magnet pool) so that some input variables (for example magnetic pull) may change when combining the data with the final air gap of the finished generator.

The measurement hardware, such as the camera system 105 and the laser tracking system 109, may have a fixed position on the ground and the stator which is to be measured may be rotated stepwise so that the system may measure and align only one stator segment at a time.

Figure 3:
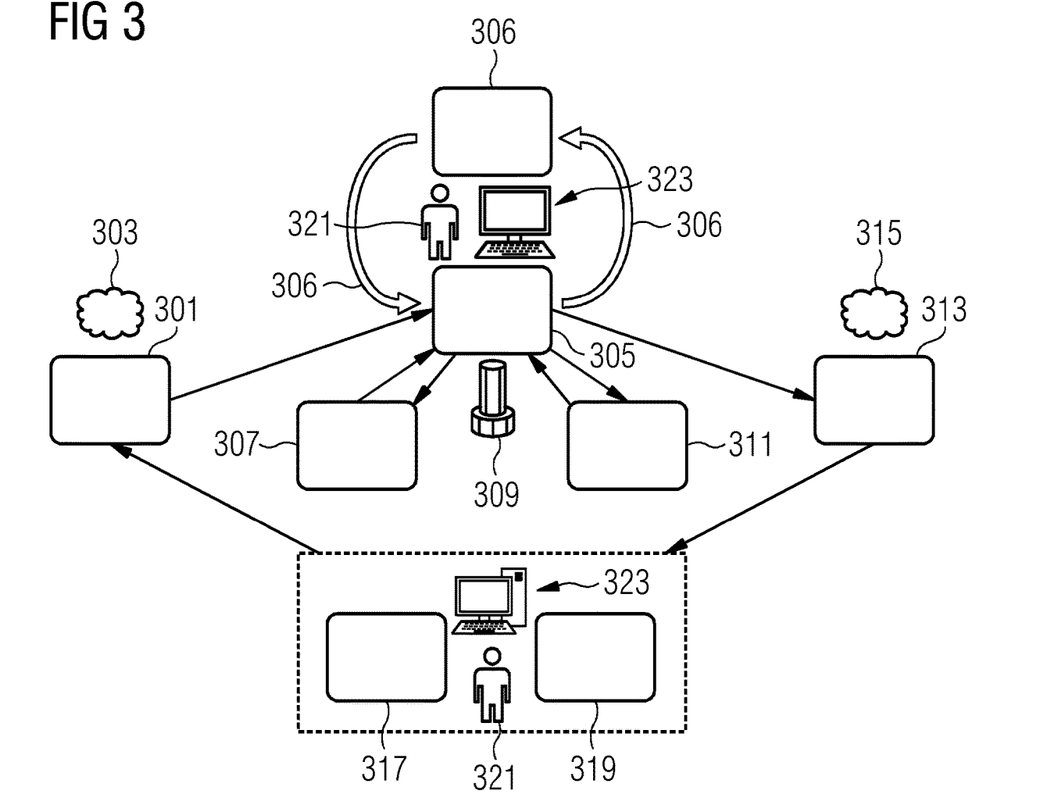
FIG. 3 schematically illustrates a method according to an embodiment of the present invention.

FIG. 3 schematically illustrates a method according to an embodiment of the present invention. In an element 301, data from suppliers of the rotor house (and stator plates, magnets, fixed shaft) are obtained, for example from a computer or network cloud 303. The data are provided to a human machine interface (HMI) and controller 305 which contains a prediction template and performs machine learning. The measurement system 307 (for example implemented as the arrangement 100, 200 illustrated in FIG. 1 or 2) provides the live feedback to the HMI controller 305. The stator is schematically shown and labelled with reference sign 309. A segment adjustment tool 311 obtains and provides data to the HMI controller 305. Upon completion of the readjustments and assembly, the final stator data are stored on a server 313, for example in a cloud 315. As a further opportunity, the stator adjustment process statistics may be derived and stored in an element 317 and the actual air gap versus the predicted air gap may be evaluated in an element 319. The system may be operable by an operator 321 having provided a computing system 323. The HMI controller 305 performs a stator adjustment process monitoring and feedback loop 306.

The embodiment to combine two different measurement tools for measuring position and/or orientation of a stator magnet may result in a higher accuracy than was achieved in a conventional measurement system. A controller unit (e.g., processor 115 in FIG. 3) may provide unique programming that can feedback the current position of each segment within few milliseconds which enables to perform the adjustment process with higher precision. Instead of fixing the measurement hardware and rotating the stator it may be possible to fixate the stator and then move the measurement system hardware around the part which is measured. Thereby, the system must be realigned for every movement of the measurement system hardware. Another alternative is to use a multiple laser tracker all on high pedestal, but this is not proven to any degree of certainty.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of determining a readjustment value in position and/or in orientation of a stator segment of a multi segment stator of an electrical machine, the stator segment to be assembled with a shaft, the method comprising:
   detecting positions of plural first reference objects attached to the stator segment using a camera system;
   detecting positions of plural second reference objects attached to the shaft using a laser tracking system;
   detecting positions of plural third reference objects attached to the camera system using the laser tracking system; and
   determining the readjustment value in position and/or in orientation of the stator segment based on the positions of the plural first reference objects, the second reference objects and the third reference objects.

2. The method according to claim 1, further comprising:
   determining position and orientation of an axis of the shaft based on the positions of the plural second reference objects, wherein determining the readjustment value is further based on the determined position and orientation of the axis of the shaft.

3. The method according to claim 1,
wherein the camera system comprises at least two or three or four cameras or more cameras each acquiring 2D image data from the stator segment from different viewing areas and/or angles,
wherein detecting the positions of the plural first reference objects comprises 3D reconstruction of a volume portion comprising the first reference objects based on the 2D image data of each of the at least two cameras.

4. The method according to claim 1,
wherein the plural first reference objects include at least 9, between 9 and 100, or more first reference objects, which are attached to a radial outer surface of the stator segment, and/or
wherein the plural second reference objects include at least 3, between 3 and 6, or more, second reference objects, from which at least 3 are arranged in a same plane perpendicular to the axis of the shaft, and/or
wherein the plural third reference objects include, for each camera of the camera system, at least 4, or more, third reference objects,
wherein the first and/or second and/or third reference objects include light reflectors attached using adhesive.

5. The method according to claim 1, wherein the laser tracking system is configured to detect the positions of the plural second reference objects and the third reference objects by detecting two angle values and a distance value of each of the second and the third reference objects.

6. The method according to claim 1, wherein the camera system and/or the laser tracking system is configured to acquire measurement data at a rate of between 1 Hz and 10 Hz or more.

7. The method according to claim 1, wherein determining the readjustment value in position and/or in orientation of the stator segment is further based:
on a target geometry of the stator, and/or
on a target position and orientation of the stator segment relative to the shaft.

8. The method according to claim 1, wherein the target geometry of the stator and/or on a target position and orientation of the stator segment relative to the shaft is derived from geometry data of a rotor of the electrical machine, the rotor to be assembled with the completed stator.

9. The method according to claim 8, wherein the geometry data of the rotor comprise at least data indicative of or defining a minimal diameter of the rotor.

10. The method according to claim 1, wherein detecting the positions of the first and/or the second and/or the third reference objects comprises detecting 3D coordinates of the first and/or the second and/or the third reference objects, respectively.

11. The method according to claim 1,
wherein the stator segment is shaped as a cylinder segment, spanning between 20° and 180°; and/or
wherein the shaft has a cylindrical shape.

12. A method of assembling a stator segment of a multi segment stator of an electrical machine with a shaft, the method comprising:
determining a readjustment value in position and/or in orientation of the stator segment of the multi segment stator of the electrical machine, the stator segment to be assembled with a shaft, by detecting positions of plural first reference objects attached to the stator segment using a camera system, detecting positions of plural second reference objects attached to the shaft using a laser tracking system, detecting positions of plural third reference objects attached to the camera system using the laser tracking system, and determining the readjustment value in position and/or in orientation of the stator segment based on the positions of the plural first reference objects, the second reference objects and the third reference objects;
changing position and/or orientation of the stator segment according to the readjustment value; and
mounting the stator segment to the shaft, if the readjustment value in position and/or in orientation is below a threshold.

13. The method according to claim 12, further comprising:
performing the method of assembling a for all stator segments of the multi segment stator; and
assembling the multi segment stator with a rotor including plural mounted permanent magnets.

14. The method according to claim 13, wherein the laser tracking system and/or the camera system is fixed.

15. The method according to claim 13, wherein the rotor is an outer rotor.

16. The method according to claim 8, wherein the rotor is an outer rotor.

* * * * *